N. B. COOPER.
Churn.
No. 28,970
Patented July 3, 1860.
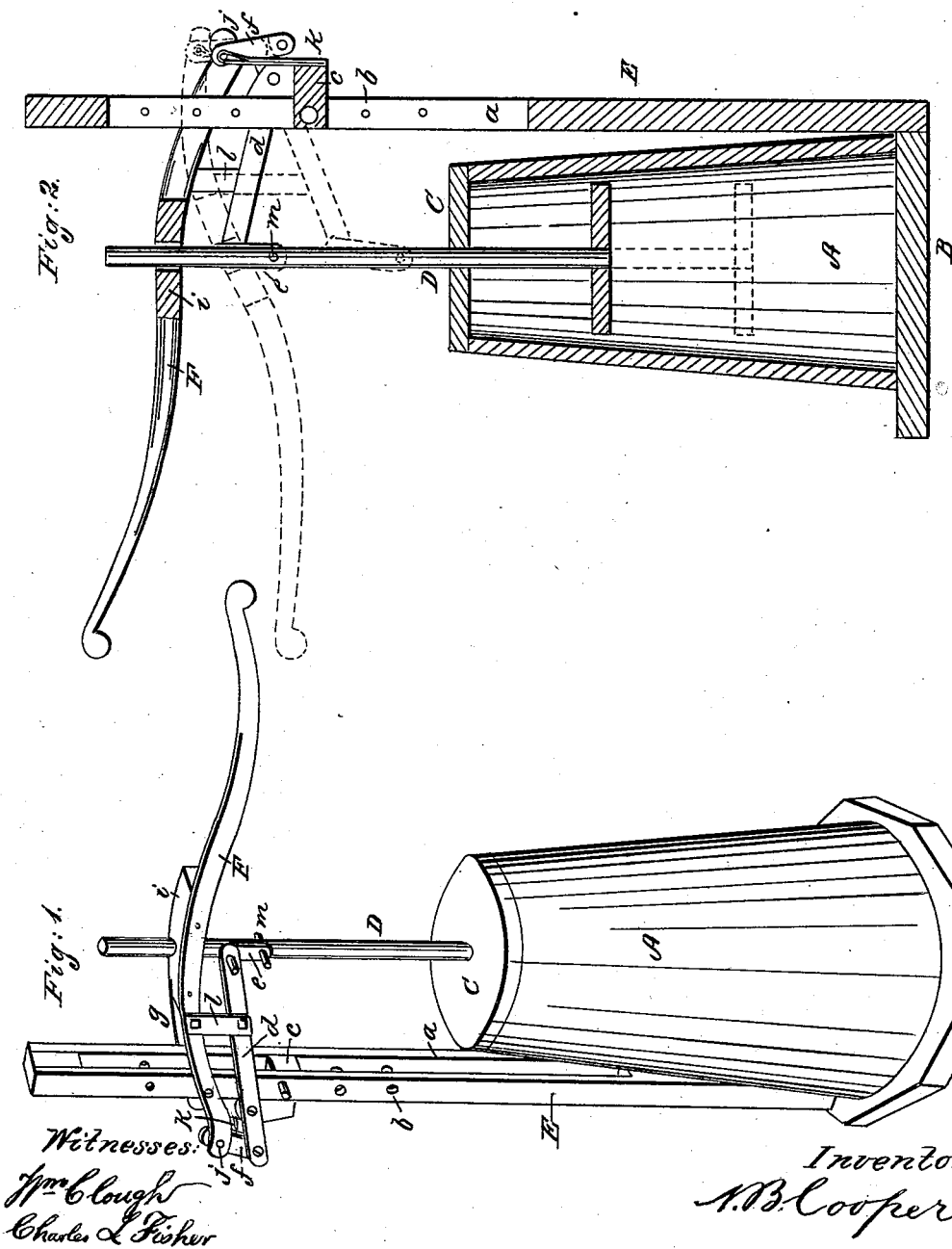

UNITED STATES PATENT OFFICE.

N. B. COOPER, OF GRATIS, OHIO.

CHURN.

Specification of Letters Patent No. 28,970, dated July 3, 1860.

*To all whom it may concern:*

Be it known that I, N. B. COOPER, of Gratis, in the county of Preble and State of Ohio, have invented a new and useful Improvement in Devices for Operating Churn-Dashers; and I do hereby declare that the following is a full and exact description thereof, reference being had to accompanying drawings, and letters of reference marked thereon, making a part of this specification.

My improvement consists in a device for operating the dasher of the ordinary or common dasher churn for the purpose of rendering the operation of churning less laborious, also in adapting the same to churns of any altitude or height as hereinafter described.

In the drawings Figure 1 represents a churn to which my improvement is applied, shown in perspective. Fig. 2 is a vertical section of the same.

Like letters of reference indicate corresponding parts in the two drawings.

A is a churn of the familiar upright conical form. It rests upon a base B and has a cover C.

D is the dasher which may be made in accordance with any of the common and approved plans. It is operated by vertical handle D which passes up through a central opening in cover C and extends to any convenient distance above the top of the churn.

E is a vertical standard framed into and supported by base B. It has a long mortise or slot ($a$) and is pierced with pin holes ($b$) which pass through the standard at right angles with the direction of the mortise ($a$).

A block ($c$) has a part which works freely up and down in the slot or mortise ($a$) and shoulders which bear against the surface of E upon either side of the mortise or slot ($a$). It is retained in any desired position vertically, by a pin passing through the holes ($b$) and a corresponding hole in C at any desired height within the compass of the mortise or slot ($a$). A bar ($d$) is pivoted to an upward extension of ($c$) carrying a link ($e$) by which it is connected with dasher handle D and another link ($f$) jointed to the opposite end from ($e$) and connecting it with the short arm of the hand lever or handle F. The handle F is pivoted to the standard E by a pin passing through one of the holes ($b$). The handle F is placed transversely against one of the edge surfaces of standard E and an auxiliary piece ($g$) corresponding with F for a certain distance as shown occupies the other edge of E and the pin ($b$) passes through the holes $b$ in the standard E and both parts of handle F. A block ($i$) is placed between the handle F and the auxiliary piece ($g$) occupying the parallel space, and is firmly secured to both. They are also connected by a pin ($j$) extending from one to the other at a point near their ends and this pin passes through one end of the link ($f$) which connects ($d$) with the handle.

Through the center of ($i$) there is an elongated vertical aperture which receives the handle D and causes it to rise and fall nearly vertically, when acted upon by the handle as will be explained. Is a gum elastic or india rubber spring. It is in the form of a loop which passes around the pin ($j$) between F and ($g$) and the two ends are brought together below and secured to the after part of ($c$).

($l$) is another spring extending from the bar ($d$) to the handle F and secured to both. The link ($e$) having a connection with the bar ($d$) depends therefrom and is fastened by a pin ($m$) upon which it vibrates, to the dasher handle D.

The operation of churning by the use of my improved device is as follows: The churn A is placed upon the base B and may be made to remain in place thereon by a few cleats nailed to B at different points around the outer circumference of A. The dasher is allowed to rest upon the bottom of the churn and a convenient height determined at which to attach the link ($e$) to the dasher handle D. A hole is bored at the proper point and the pin ($m$) is inserted through the handle and link as shown. The block ($c$) is then adjusted vertically in the slot or mortise ($d$) with reference to the position of the attachment ($m$) so that in working the handle F to give the required length of stroke to the dasher rod D the short bar ($d$) will be caused to vibrate vertically nearly the same distance each way from a horizontal line. The handle F if then set free will be acted upon by the spring ($k$) secured to its short arm, depressing it and causing the handle to be carried up; but as the short arm of ($d$) is connected by link $f$ with the short arm of F the arm ($d$) participates in the same movement and its long arm is carried up carrying with it the dasher D with which it is connected by link ($e$).

If the parts are properly arranged the dasher will be elevated by the action of the spring operating as has been explained until it is at a suitable distance according to the discretion of the operator above the level of the cream in the churn. Let it however be observed that the short arm of F is longer than the short arm of (d) so that the latter acted upon by the former through the link (f) its long arm is caused to move farther or through a greater space than is traversed by the corresponding part of the long arm of A in the operation of the same to be explained. Let it now be supposed that the long arm of F is being depressed or forced down by the operator, the bar (d) being connected with its opposite end by the link (f) the bar (d) will obviously be carried down simultaneously with it; but on account of the shorter length of its short arm its longer arm will be caused to move faster than a corresponding part of the long arm of F and will separate from it as they both descend. This separation of the two long arms is resisted by the spring (l) which becomes extended as the parts are carried down and contracts as they return. By this means or by the general tension of the spring (l) the dasher is held back and the "lost motion" or "play" which results from any want of nicety in the fitting of the joints or pivots is taken up so that when the dasher strikes the surface of the cream it acts upon it with all the momentum and with the full concussive force of all the moving parts simultaneously and compactly applied. When the long arm of F is carried down as explained to the end of the downward stroke it is released from pressure and the spring (k) attached to its short arm and secured to (c) which had been extended by the operation, contracts and causes the arm F to return to its elevated position carrying with it all the parts with which it is connected including the churn dasher, and thus a stroke is completed. The operation may then be continued with an appropriate rapidity of strokes according to the discretion of the operator until the churning is finished.

It is supposed that the advantages of my improvement, which are claimed to consist simply in rendering the labor of churning with the old fashioned dasher churn, lighter and easier, does not need to be presented. The principle upon which my improvement operates is the same as that which is employed in many similar processes, such for example as the mode of pumping, frequently employed, wherein the pump rod is lashed to a rude "spring pole." The labor of lifting and returning the ordinary churn dasher by the smooth vertical handle, is by my process, or that which my improvement introduces, changed to an easy downward pressure upon a nearly horizontal bar or handle, the parts returning upwardly to their place by the force of the spring which was easily overcome by the downward pressure.

Many persons still retain a preference for the old dasher churn over all the new and highly extolled inventions for churning; others are not able to purchase the more expensive devices, so that notwithstanding the many inventions for churning it is believed that the larger part of this work is still done with the old dasher churn. My invention relates exclusively to this style of churn and its object is to reduce the labor attending its use so that all its advantages may be secured.

Having thus described my invention what I claim as new and desire to secure by Letters Patent is—

The herein described mechanism for operating a churn dasher, the same consisting of the following parts: base, B; upright, E; block, c; hand lever, F; pivoted bar, d; links, e, f; and springs, k, l; as combined, and arranged in relation to each other, for the purposes specified.

N. B. COOPER.

Witnesses:
WM. CLOUGH,
CHARLES L. FISHER.